United States Patent
Abe (10) Patent No.: US 6,580,713 B1
(45) Date of Patent: Jun. 17, 2003

(54) RADIO COMMUNICATION APPARATUS AND MOBILE RADIO COMMUNICATION SYSTEM

(75) Inventor: Masami Abe, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/236,457

(22) Filed: Jan. 25, 1999

(30) Foreign Application Priority Data

Jan. 23, 1998 (JP) .......................................... 10-011050

(51) Int. Cl.[7] .................................................. H04L 1/18
(52) U.S. Cl. ...................................... 370/394; 714/748
(58) Field of Search ................................ 370/394, 280, 370/311, 335, 342, 252, 349, 355; 375/130; 455/522, 574, 69; 714/748–750, 758

(56) References Cited

U.S. PATENT DOCUMENTS

| | | | | |
|---|---|---|---|---|
| 4,422,171 A | * | 12/1983 | Wortley et al. | 714/748 |
| 4,551,834 A | * | 11/1985 | Lienard | 370/394 |
| 4,779,274 A | | 10/1988 | Takahashi et al. | |
| 5,056,109 A | * | 10/1991 | Gilhousen et al. | 455/522 |
| 5,537,414 A | * | 7/1996 | Takiyasu et al. | 714/749 |
| 6,088,337 A | * | 7/2000 | Eastmond et al. | 714/758 |
| 6,154,454 A | * | 11/2000 | Abe | 370/335 |

* cited by examiner

Primary Examiner—Steven Nguyen
Assistant Examiner—Phuongchau Ba Nguyen
(74) Attorney, Agent, or Firm—Venable LLP; Robert J. Frank (57) ABSTRACT

A mobile radio communication system for communicating between a base station and a mobile station by means of frames, each frame including a header and data. The mobile station includes a transmission number provider which provides a first transmission number to a first frame to be transmitted to the base station, and a transmission number extractor which extracts the first transmission number indicated in a header pattern of a second frame transmitted by the base station. The base station includes a reception number detector which detects the first transmission number included in the first frame transmitted by the mobile station, and a header provider which provides a header pattern corresponding to the first transmission number of the second frame. The mobile station retransmits the first frame when the mobile station does not receive the first transmission number indicated in the header pattern of the second frame.

4 Claims, 6 Drawing Sheets

| CONTROL IDENTIFICATION NUMBER (CIDN) | TRANSMISSION FLAG (TF) | RECEPTION FLAG (RF) | BUFFER ADDRESS |
|---|---|---|---|
| 1 | 1 | 1 | ADDRESS 100 (USER INFO. SIGNAL 1) |
| 2 | 1 | 1 | ADDRESS 200 (USER INFO. SIGNAL 2) |
| 3 | 1 | 0 | ADDRESS 300 (USER INFO. SIGNAL 3) |
| 4 | 1 | 0 | ADDRESS 400 (USER INFO. SIGNAL 4) |
| 5 | 0 | 0 | |
| ---- | | | |
| N | | | |

TRANSMISSION CONTROL TABLE

RADIO COMMUNICATION APPARATUS AND MOBILE RADIO COMMUNICATION SYSTEM

BACKGROUND OF THE INVENTION

1. Field of the Invention

This invention relates generally to radio communication apparatus including a mobile radio communication system. More specifically, it relates to a method of controlling the transmission and reception of frames of a Code Division Multiple Access (CDMA) communication system.

2. Description of the Background Art

In a conventional mobile radio communication system, a transmission channel and a reception channel are provided for communication between a base station and one or more mobile stations.

The operation of a conventional CDMA system is as follows. Assume that a mobile station is transmitting a user information signal (e.g. a signal transmitting voice and/or data) over the transmission channel to a base station. In the transmitter of the mobile station, the user information signal is assigned to a predetermined frame, error corrected, modulated, the output of the modulator spread with a user information spreading code such as a pseudo-random number code, and the spread user information signal combined with a header. The header is then spread by use of a spreading code and the spread header used to synchronize the transmitting station with the base station receiver. The spread user information signal and the spread header are up-converted to a transmission signal having a radio frequency bandwidth and then radiated via an antenna to the receiver of the base station.

The transmission signal coupled to the base station receiver is down-converted to the spread user information signal and the spread header. The down-converted spread user information signal is next despread by means of the user information spreading code, the spread header despread by means of the header spreading code, and the header used to detect the head of the frame. After the head of the frame has been detected, the user information signal is demodulated and decoded. The user information signal is then transmitted to a remote communication apparatus such as another mobile station in the system or a telephone in the public telephone network.

In the conventional CDMA mobile radio communication system, the base station transmits back to the mobile station which originated the user information signal either an acknowledged signal (ACK) or a not acknowledged signal (NAK). The base station sends either an ACK or an NAK signal to the mobile station after receiving the user information signal to indicate to the mobile station whether or not a signal has been received from the mobile station. This acknowledgment is needed because not all transmission paths between the mobile and base stations are reliable and not all transmitted user information signals reach the base station. If the mobile station receives an NAK signal, it retransmits the user information signal to the base station.

For example, to confirm that every user information signal transmitted from the mobile station has been correctly received at the base station, a conventional request repeat system of the type described in U.S. Pat. No. 4,779,274 is provided. In the request repeat system, if the base station does not receive a user information signal or finds errors in the user information signal of a frame, it requests the mobile station to repeat the user information signal. The mobile station then retransmits the user information signal after inserting an individual transmission number into the data portion of each frame. After receiving this signal, the base station inserts into the data portion of the frame either an ACK or NAK signal corresponding to the transmission number and sends the ACK or NAK signal and the transmission number via the reception channel to the mobile station.

In another method of transmitting the ACK signal or NAK signal, the receiving station may transmit the ACK signal or NAK signal by using a third channel assigned for the exclusive use of the ACK and NAK signals. However, if a third channel is used for transmission of the ACK and NAK signals, the transmission efficiency of the communication between the two stations is reduced because additional equipment is needed, the ACK and NAK signals occupy a part of the user information signal in each frame and each acknowledge signal provides only a small amount of information.

SUMMARY OF THE INVENTION

Therefore, it is an object of the present invention to provide a mobile radio communication system and a radio communication apparatus that maintains high transmission efficiency and positively receives the transmitted frame.

To accomplish these objectives, a radio communication system is provided for communicating between a base station and a mobile station by means of frames, each frame including a header and data. The mobile station includes a transmission number provider and a transmission number extractor, the transmission number provider providing a first transmission number to a first frame to be transmitted to the base station, and the transmission number extractor extracting the first transmission number indicated in a header pattern of a second frame transmitted by the base station.

The base station includes a reception number detector and a header provider, the reception number detector detecting the first transmission number included in the first frame transmitted by the mobile station, and the header provider providing the header pattern corresponding to the first transmission number to the second frame. The mobile station retransmits the first frame when the mobile station does not receive the first transmission number indicated in the header pattern of the second frame.

Further, to accomplish these objectives, the radio communication system performs the follow steps:

provides a first transmission number to a first frame at the mobile station;

transmits the first frame from the mobile station to the base station;

extracts the first transmission number from the first frame at the base station;

provides a header pattern corresponding to the first transmission number to a second frame to be transmitted to the mobile station;

transmits the second frame including the header pattern indicating the first transmission number to the mobile station;

extracts the header pattern indicating the first transmission number from the second frame at the mobile station; and re-transmits the first frame to the base station when the mobile station can not receive the header pattern indicating the first transmission number.

BRIEF DESCRIPTION OF THE DRAWINGS

These and other objects and features of the present invention will become more apparent from consideration of the following detailed description taken in conjunction with the accompanying drawings in which.

DESCRIPTION OF THE PREFERRED EMBODIMENT

Figure 5:
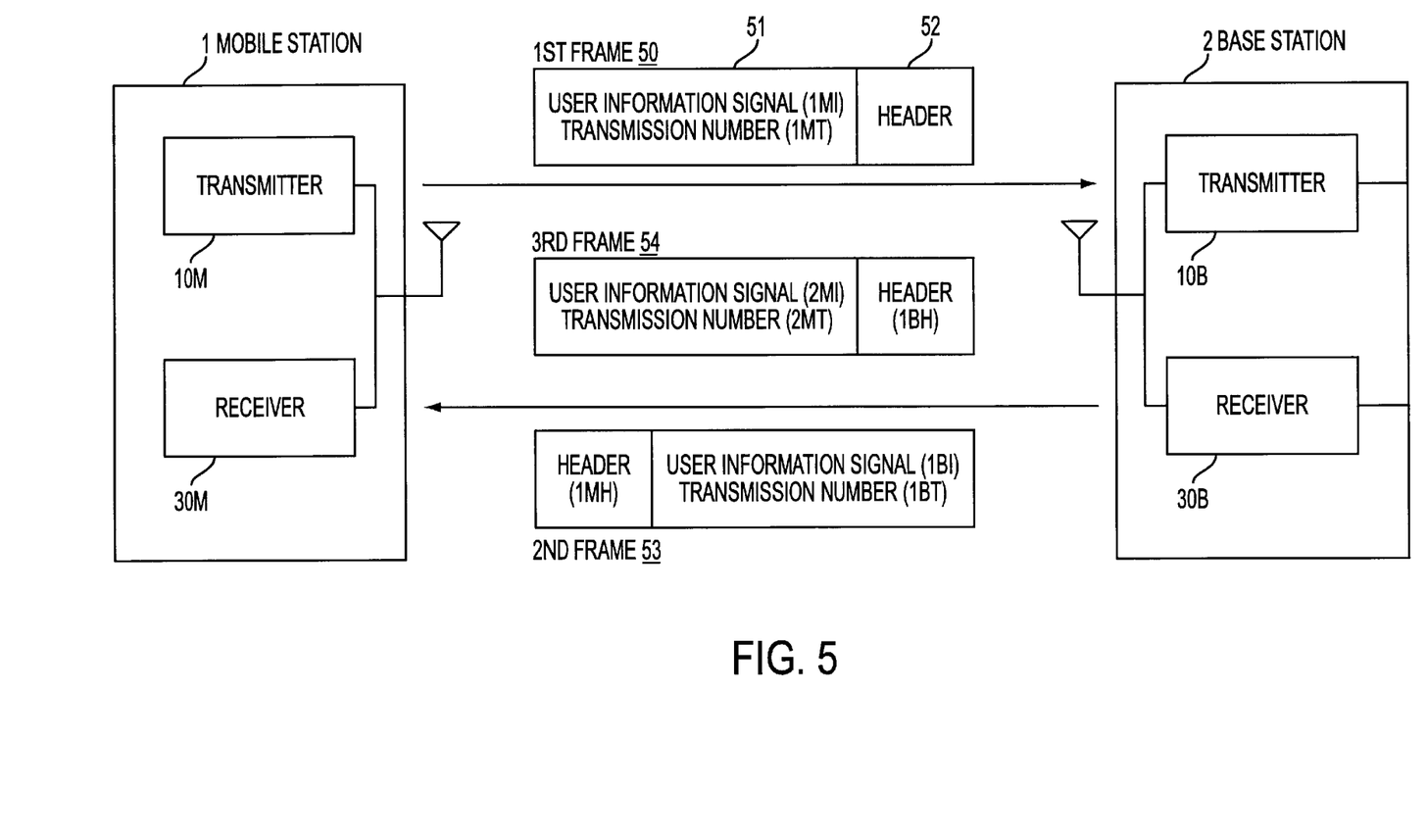
FIG. 5 is a block diagram illustrating communication between the mobile and base stations of the invention.

The basic concept of the invention will be described with the aid of the block diagram of FIG. 5. FIG. 5 depicts a portion of a CDMA system comprising a mobile station 1 and a base station 2. The mobile station 1 is provided with a transmitter 10M and a receiver 30M. The base station 2 is provided with a plurality of transmitter-receiver sets, transmitter 10B and receiver 30B comprising one such set, the other transmitter-receiver sets not being shown. The transmitter 10M and the transmitters in the base station including transmitter 10B are of substantially identical construction, and the receiver 30M and the receivers in the base station including receiver 30B are also of substantially the same construction.

In operation, the transmitter 10M transmits a first frame 50 having a data portion 51 and a header portion 52. The data portion 51 includes a user information signal 1MI and a transmission number 1MT. The receiver 30B receives the first frame 50 and extracts the user information signal 1MI and the transmission number 1MT therefrom. The user information signal 1MI is transmitted to a remote mobile station (not shown) or the public telephone system (not shown) via the receiver 30B and a transmitter other than transmitter 10B in the base station 2. The transmission number 1MT is also input to transmitter 10B which selects a header pattern 1MH corresponding to the transmission number 1MT among a plurality of headers stored in the transmitter 10B. The header portion 52 is used only for synchronizing the transmitter 10M with the receiver 30B.

The transmitter 10B transmits to the mobile station 1 a second frame 53 having the header pattern 1MH, a user information signal 1BI received from the remote station and a transmission number 1BT assigned by transmitter 10B. The receiver 30M receives the second frame 53 and extracts the header pattern 1MH, the user information signal 1BI and the transmission number 1BT therefrom. Since the mobile station 1 has received the header pattern 1MH which corresponds to the transmission number 1MT, the mobile station 1 recognizes that the base station 2 has received the first frame 50 having the transmission number 1MT. The user information signal 1BI is provided to a signal processor (not shown) for demodulation and decoding.

The transmission number 1BT is provided to the transmitter 10M which selects a header pattern 1BH corresponding to the transmission number 1BT among a plurality of headers stored in the transmitter 10M and transmits a third frame 54 having the header pattern 1BH, a user information signal 2MI and a transmission number 2MT to the base station 2. The receiver 30B receives the third frame 54 and extracts the header pattern 1BH, the user information signal 2MI and the transmission number 2MT therefrom. Based on receiving the header pattern 1BH, the base station 2 recognizes that the mobile station 1 has received the second frame 53.

Summarizing, the mobile station 1 provides transmission numbers 1MT, 2MT, 3MT, 4MT . . . to each sequential frame and receives header patterns corresponding to transmission numbers 1MT, 2M5, 3M5, 4MT . . . , transmitted from the base station 2. Consequently, the mobile station 1 recognizes that the base station 2 has received each frame it has transmitted. Similarly, the base station 2 provides transmission numbers 1BT, 2BT, 3BT, 4BT . . . , to each sequential frame and receives header patterns corresponding to transmission numbers 1BT, 2BT, 3BT, 4BT . . . , transmitted from the mobile station 1. Therefore, the base station 2 recognizes that the mobile station 1 has received each frame.

Figure 1A:
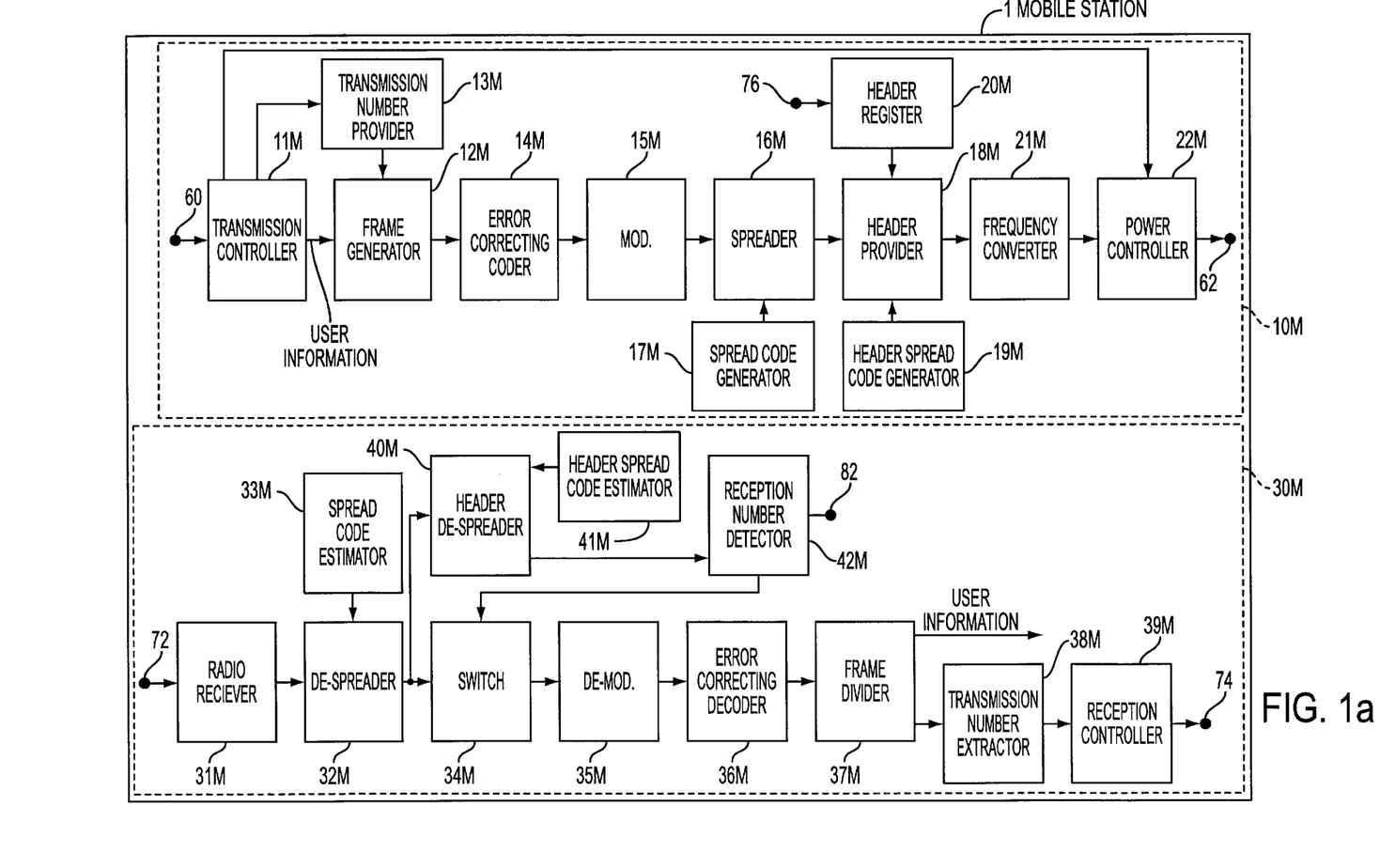
FIGS. 1a and 1b are block diagrams showing the construction of mobile and base stations respectively of a CDMA system according to the invention.
Figure 1B:
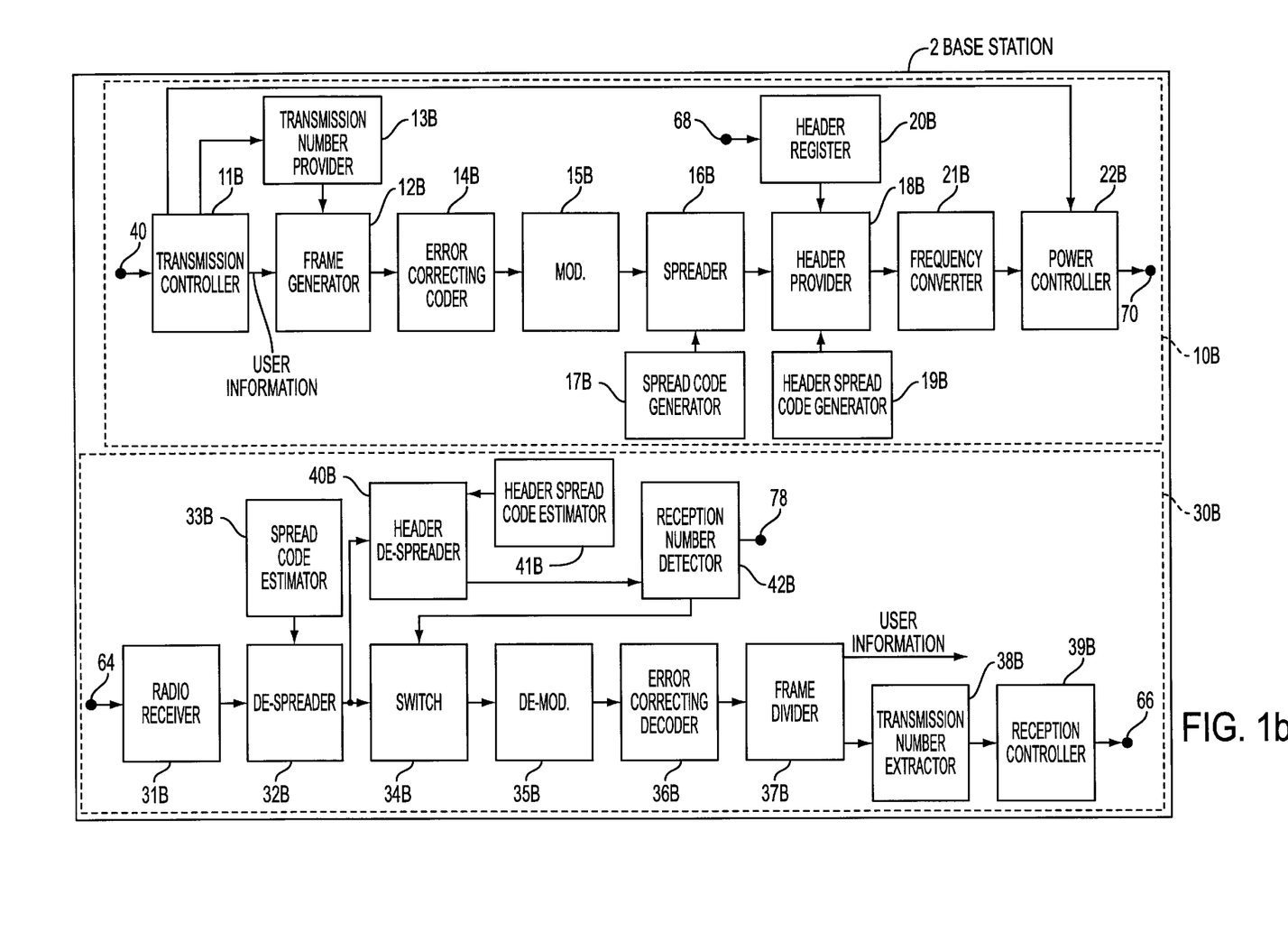

Referring to FIGS. 1a and 1b, FIG. 1a shows details of the transmitter 10M and the receiver 30M comprising mobile station 1 and FIG. 1b shows details of the transmitter 10B and the receiver 30B forming one of the plurality of transmitter-receiver sets comprising the base station 2. As explained above, transmitters 10M and 10B are substantially identical, and receivers 30M and 30B are substantially identical. The channel between transmitter 10M of mobile station 1 and receiver 30B of base station 2 is defined herein as the reverse traffic channel, and the channel between transmitter 10B of base station 2 and receiver 30M of mobile station 1 is defined herein as the forward traffic channel.

The transmitter 10M includes a transmission controller 11M, a frame generator 12M, a transmission number provider 13M, an error correcting coder 14M, a modulator 15M, a spreader 16M, a spread code generator 17M, a header provider 18M, a header spread code generator 19M, a header register 20M, a frequency converter 21M and a power controller 22M. User information signals (e.g. voice and/or data signals) applied to terminal 60 of the transmission controller 11M are input to the frame generator 12M when the controller 11M detects that user information signals are be transmitted. The transmission controller 11M also instructs the transmission number provider 13M to provide transmission numbers corresponding to the user information signals to the frame generator 12M. That is, the transmission controller 11M provides each user information signal to the frame generator 12M and simultaneously instructs the transmission number provider 13M to provide the frame generator 12M with a transmission number corresponding to each user information signal.

However, if it is necessary to retransmit a user information signal as described hereinafter, the transmission controller 11M provides the user information signal to the frame generator 12M by reading it out from a first in-first out (FIFO) memory (not shown) in which is stored all of the user information signals. Simultaneously, the transmission number provider 13M provides the same transmission number as that previously provided to the frame generator 12M based on an instruction received from the transmission controller 11M.

There are a large number of transmission numbers (1 to N) which are used consecutively and repeatedly. As mentioned above, the transmission number provider 13M provides a transmission number to the frame generator 12M in order to add the transmission number to the user information signal of each frame. The transmission number provider 13M may be a counter for counting a number in response to each frame period of the user information signal and for outputting that number to the frame generator 12M in response to the receipt of a loading signal from the transmission controller 11M.

The frame generator 12M forms a frame with a user information signal and a transmission number, and inputs each frame to the error correcting coder 14M. The error correcting coder 14M codes the signal output from the frame generator 12M and provides the coded signal to the modulator 15M. A convolutional code may be used, for example, as the error correcting coding.

The modulator 15M modulates the coded signal by the use of quadrature phase shift keying (QPSK) modulation or binary phase shift keying (BPSK) modulation, for example, and provides the modulated signal to the spreader 16M. The spreader 16M spreads the modulated signal with a spread code such as a pseudo-random code provided by the spread code generator 17M and provides the spread signal to the header provider 18M. The header provider 18M spreads a header pattern stored in the header register 20M with a header spread code provided by the header spread code generator 19M. The header provider 18M also assigns the header to the frame including the spread signal.

In this embodiment, the header patterns have two functions. The first function is to synchronize with the receiver 30B of the base station 2, and the second function is to provide acknowledgment information to the mobile station 1 without actually sending an acknowledgment signal.

The header register 20M has at least one additional header pattern which indicates that the transmission number is "unidentified". Identifying the header spread code generated by the header spread code generator 19M as PN#2 and the spread code generated by the spread code generator 17M as PN#1, the header spread code PN#2 is expressed as PN#2=PN#1*PN#X, where PN#X is an optional spread code. This equation shows that the spread gain of PN#2 is larger than the spread gain of PN#1, and PN#2 includes a component of PN#1.

The frequency converter 21M up-converts the output signal of the header provider 18M to a radio signal having a radio frequency bandwidth, and the radio signal is radiated to the air via a duplexer and an antenna (not shown) at terminal 62. The power controller 22M, which includes a power amplifier, controls the transmission power of the radio signal output by the frequency converter 21M based on a signal received from the transmission controller 11M. That is, the power controller 22M decreases or reduces to zero the power output by the transmitter 10M at terminal 62 when there is no user information signal.

The output of transmitter 10M is radiated to receiver 30B of base station 2 and coupled to transmitter 10B via terminals 66 and 68. The operation of receiver 30B is the same as receiver 30M, which will be explained hereinafter, and the operation of transmitter 10B is the same as that of transmitter 10M which has already been explained.

The receiver 30M, which receives a radio signal transmitted by transmitter 10B at terminal 70, includes a radio receiver 31M having an input terminal 72, a despreader 32M, a spread code estimator 33M, a switch 34M, a demodulator 35M, an error correcting decoder 36M, a frame divider 37M, a transmission number extractor 38M, a reception controller 39M, a header despreader 40M, a header spread code estimator 41M and a reception number detector 42M. The radio receiver 31M receives at terminal 72 a radio signal transmitted by the transmitter 10B of the base station 2 and down-converts it to a baseband signal having an intermediate frequency bandwidth. The baseband signal is supplied to the despreader 32M which despreads the baseband signal by using the spread code (PN#1) provided by the spread code estimator 33M. The spread code estimator 33M, which comprises a matched filter or sliding correlating detector, estimates the phase of the spread code to synchronize with the baseband signal and provides the spread code (PN#1) to the despreader 32M. To estimate the phase of the spread code (PN#1), either the input signal or the output signal of the despreader 32M is provided to the spread code estimator 33M.

The switch 34M switches the output signal of the despreader 32M to the demodulator 35M during a predetermined portion of a frame determined by a signal received from the reception number detector 42M. In this case, the switch 34M opens at the beginning of the predetermined frame portion.

The demodulator 35M demodulates the output signal of switch 34M and provides its output to the error correcting decoder 36M. The error correcting decoder 36M decodes and error corrects the output signal of the demodulator 35M and provides a decoded output signal to the frame divider 37M. The frame divider 37M divides the decoded output signal of the error correcting decoder 36M during one frame period and reassembles the user information signal. The user information signal is provided to a user information processing circuit (not shown) of the mobile station 1.

The transmission number extractor 38M extracts the transmission number from the predetermined portion of the frame. The reception controller 39M selects the header pattern in response to its transmission number and provides it to the header register 20M of transmitter 10M via terminals 74 and 76. In addition, if the transmission number extractor 38M can not extract or can not distinguish the transmission number from the frame due to the destruction thereof, the transmission number extractor 38M selects the particular header pattern defined as "unidentified" and provides it to the header register 20M.

The header despreader 40M despreads the output signal of the despreader 32M by using the header spread code (PN#2) provided by the header spread code estimator 41M and provides a despread signal to the reception number detector 42M. In the header despreader 40M, since only the header portion of the frame is spread with the header spread code, the header pattern is correctly extracted from the frame. The header spread code estimator 41M, which has a matched filter or sliding correlating detector, estimates the phase of the output signal of the despreader 32M and outputs the header spread code to the header despreader 40M.

The reception number detector 42M detects the header pattern provided by the header despreader 40M and provides acknowledge information (either a transmission number or an "unidentified") signal) indicated in the header pattern to the transmission controller 11M. That is, the acknowledge information, which is either a transmission number or a signal indicating that a transmission signal is not in the header pattern, shows that the base station has received the user information signal including its particular transmission number.

The receiver 30B of the base station 2 has the same function as receiver 30M and therefore no additional explanation of its operation will be provided.

Figure 2:
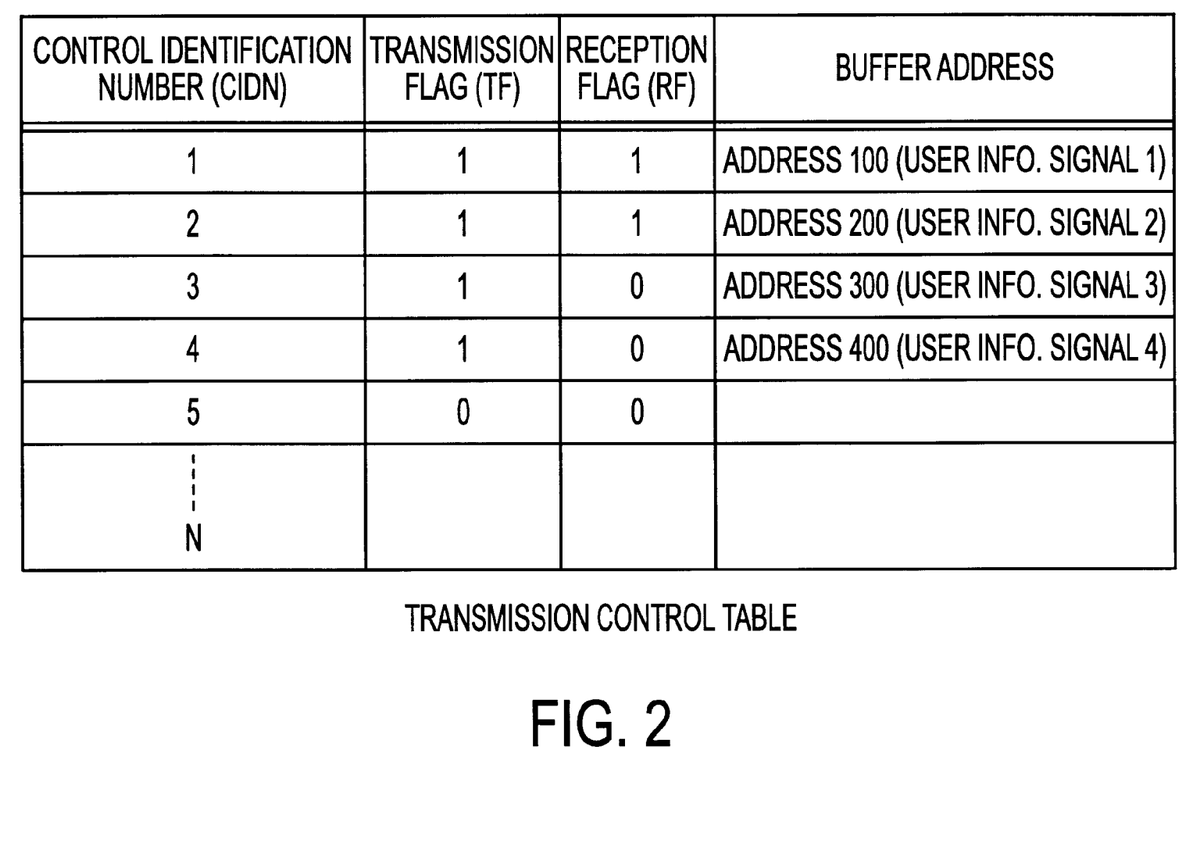
FIG. 2 is a transmission control table for describing the operation of the transmitters employed in the mobile and base stations.
Figure 3:
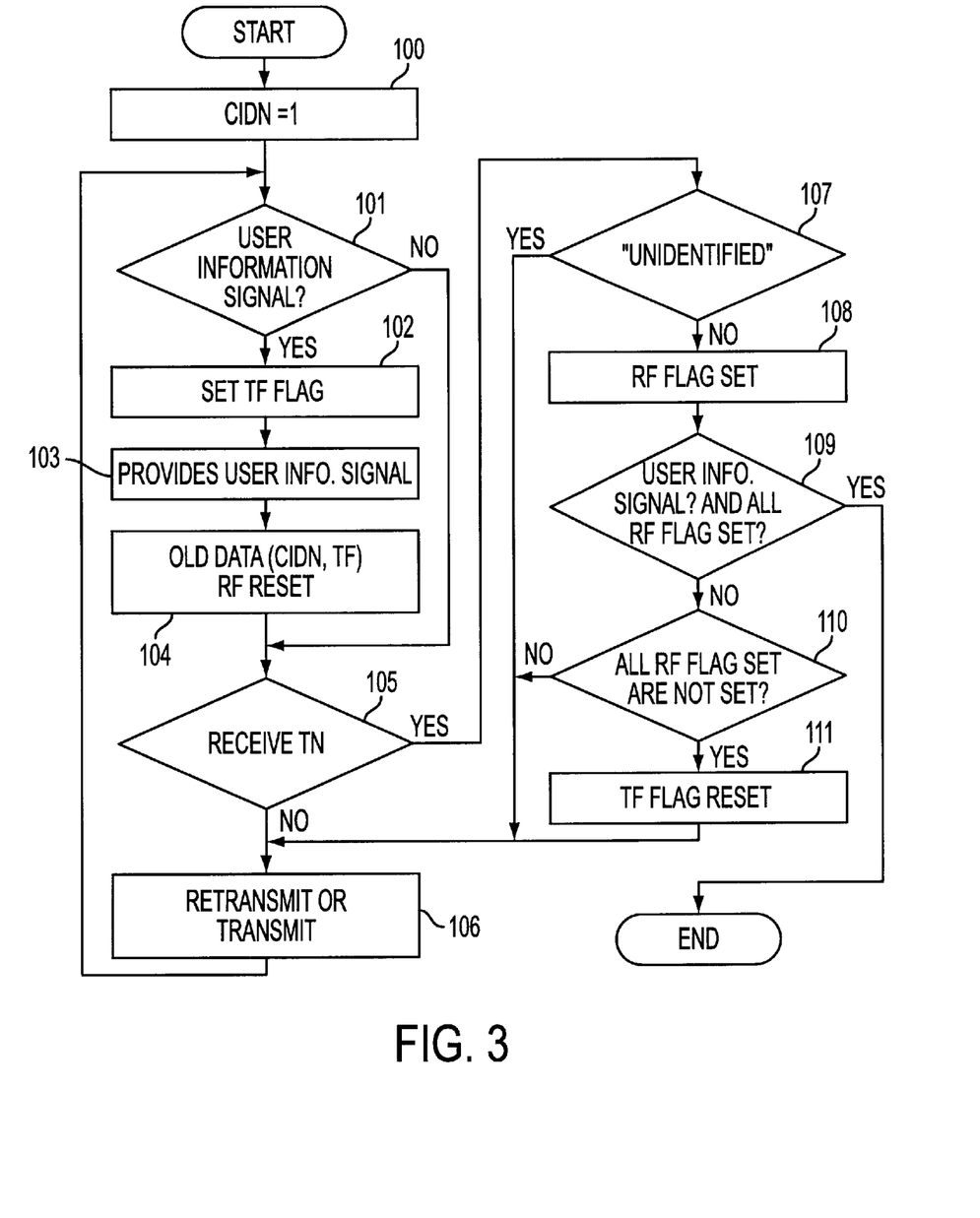
FIG. 3 is a flow chart showing the operation of a transmission controller according to the invention.

Referring to FIGS. 2 and 3, the transmission control and operation flow of the transmission controller 11M (11B) will be explained. As shown in FIG. 2, a transmission control table is comprised of a control identification number (CIDN) field, a transmission flag (TF) field, a reception flag (RF) field and a buffer address field. The CIDN field stores fixed predetermined numbers (1–N) corresponding to transmission numbers (1–N). The TF field shows whether or not a user information signal having a transmission number corresponding to one of the fixed numbers (1–N) of the CIDN field has been provided to the frame generator 12M. That is, the TF field shows that a user information signal having a transmission number has been transmitted to the base station 2. The RF field shows whether one of the transmission numbers provided by the mobile station 1 matches a transmission number indicating the header pattern returned from the base station 2. That is, the RF field shows that each user information signal has been received by the base station 2. The buffer address field shows addresses of the FIFO memory (not shown) which stores all transmitted user information signals. The address information may be used when the user information signal is retransmitted.

As shown in FIG. 2, the transmission controller 11M has already provided user information signals 1–4 (CIDN 1–4) to the frame generator 12M as indicated by the TF field "1". The user information signals 1–4 have been respectively stored in the addresses 100, 200, 300 and 400 of the FIFO memory. The transmission controller 11M has already received the header patterns corresponding to user information signals 1–2 from the base station 2 as indicated by the RF field "1". Next, the transmission controller 11M will provide user information signal 5 having transmission number 5 (CIDN 5) to the frame generator 12M and will write the address of the FIFO memory storing user information signal 5 to the buffer address field.

In FIG. 3, when the transmitter 10M begins to transmit user information signal 1, the transmission controller 11M causes the transmission number provider 13M to set a parameter ID (corresponding to CIDN) of the transmission number provider 13M to "1" as an initial state to provide the transmission number 1 to the user information signal 1 (STEP 100), and the transmission controller 11M checks that there are user information signals to be transmitted (STEP 101). If there is a user information signal 1, the transmission flag (TF) of the CIDN 1 corresponding to the parameter ID 1 (transmission number 1) is set to "1" (STEP 102). Simultaneously, the transmission controller 11M provides its user information signal 1 to the frame generator 12M (STEP 103). At that time, the transmission number provider 13M provides a transmission number 1 corresponding to the parameter ID 1 to the frame generator 12M. Similarly, if there are user information signals 2–4, user information signals are provided transmission numbers 2–4 respectively as described above.

When there are not any other user information signals to be provided to the frame generator 12M, the CIDN, TF, RF and buffer address fields, which are old enough and do not need to retransmit a user information signal, are reset or cleared (STEP 104). This process is performed by using the CIDN (1–N) repeatedly.

The transmission controller 11M discriminates whether or not transmission numbers 1–4 can be detected by the transmission number detector 42M as a header pattern transmitted by the base station 2 via terminals 78 and 82 (STEP 105). If a header pattern indicating any of transmission numbers 1–4 is not detected STEP 106 is carried out to retransmit the user information signal which is not detected. Further, if a header pattern detected by transmission number detector 42M indicates an "unidentified" transmission number, STEP 106 is carried out (STEP 107). If a header pattern indicating any transmission numbers 1–4 is detected, the reception flag corresponding to the transmission number is set to "1" which indicates that user information 1 is to be received by the base station (STEP 108).

The transmission controller 11M confirms that the transmission operation is to be stopped when there are no other user information signals to be transmitted and all RF flags have been set (STEP 109). If there is no user information signal and all RF flags are set, this transmission operation is ended.

If there are any user information signals or all RF flags are not set, the transmission controller 11M checks to determine the condition of the RE flags. (STEP 110). If all RF flags are set, STEP 106 is carried out. If all RF flags are not set, the TF flag corresponding to the RF flag which is not set is reset (STEP 111) and then STEP 106 is carried out.

In STEP 106, If there is a user information signal, the corresponding TF flag has already been set and the corresponding RF flag has not yet been set, or the TF flag is reset, the user information signal is provided to the frame generator 12M and the transmission number provider 13M provides the same transmission number to its user information signal. If there is any other new user information signal, the transmission controller 11M provides a new transmission number to its user information signal, and STEPS 101 to 105 are carried out repeatedly.

Next, the operations for transmitting the user information signal including the transmission number at mobile station 1 and for receiving the transmission signal at the base station 2 are explained. As shown in FIG. 1a, the transmission controller 11M provides a user information signal to the frame generator 12M. The frame generator 12M forms a frame with the user information signal and a transmission number (e.g. NN) and provides the frame to the error correcting coder 14M. The error correcting coder 14M codes the user information signal and provides the coded user information signal to the modulator 15M. The modulator 15M modulates the coded user information signal and provides the modulated user information signal to the spreader 16M. The spreader 16M spreads the modulated user information signal with a spread code and provides the spread user information signal to the header provider 18M. The header provider 18M spreads a header pattern of a header stored in the header register 20M with a header spread code provided by the header spread code generator 19M and assigns the header to the frame having the spread user information signal. The frame, including the user information signal and the header, is up-converted to the radio frequency signal by the frequency converter 21M and is provided to the power controller 22M. The power controller 22M separately controls the transmission power of the user information signal and the header so that the transmission power of the header is larger than that of the user information signal. The power-controlled radio frequency signal is radiated to the air via an antenna duplexer and antenna (not shown) via terminal 62.

The radio frequency signal is provided to the radio receiver 31B of the base station 2 via an antenna duplexer and antenna (not shown) and a terminal 64 and the signal is down-converted to the baseband signal. The baseband signal is despread with the spread code by the despreader 32B and the despread baseband signal is provided to the switch 34B and the header despreader 40B. The header despreader 40B despreads the baseband signal provided by the despreader 32B with the header spread code provided by the header spread code estimator 41B and provides it to the reception number detector 42B. The reception number detector 42B detects the head of the baseband signal and instructs the switch 34B to switch the baseband signal to the demodulator 35B. The despread baseband signal is demodulated by the demodulator 35B and the demodulated baseband signal is decoded by the error correcting decoder 36B.

The decoded baseband signal is provided to the frame divider 37B. The frame divider 37B divides the baseband signal into user information and the transmission number (NN). The transmission number (NN) is extracted by the reception number extractor 38B and is provided to the reception controller 39B. The reception controller 39B selects the header pattern (NN) corresponding to the transmission number (NN) and provides it to the header register 20B via terminals 66 and 68. The header register 20B receives and stores the header pattern (NN) in order to assign it to the next user information signal to be transmitted to the mobile station 1.

If the transmission number (NN) is not extracted by the reception number extractor 38B, the reception controller 39B informs the header pattern by indicating that the transmission number is "unidentified" to the header register 20B.

The header pattern (NN) is assigned to the next frame to be transmitted from the transmitter 10B of the base station. The next frame with the header pattern (NN) is transmitted through the air as a transmission signal via the frequency converter 21B and the power controller 22B.

In the mobile station 1, the radio receiver 31M receives the frame having the header pattern (NN). The frame signal is down-converted to the baseband signal. The baseband signal is despread with the spread code by the despreader 32M and the despread baseband signal is provided to the switch 34M and the header despreader 40M. The header despreader 40M despreads the baseband signal with the header spread code provided by the header spread code estimator 41M and provides it to the reception number detector 42M. The reception number detector 42M detects the header pattern (NN) or the header pattern corresponding to the unidentified transmission number. When the header pattern (NN) is detected, the reception number detector 42M informs the transmission controller 11M via terminals 82 and 60 that the header pattern (NN) indicates the transmission number (NN). As a result, the transmission controller 11M recognizes that the base station 2 has received the user information signal having the transmission number (NN).

Similarly, the transmission controller 11B of the base station 2 provides a transmission number (BB) to a user information signal to be transmitted to the mobile station 1 via terminals 70 and 72. The user information signal having the transmission number (BB) is received by the radio receiver 31M, and the transmission number (BB) is extracted by the transmission number extractor 38M. Then the reception controller 39M selects a header pattern (BB) corresponding to the transmission number (BB) extracted by the transmission number extractor 38M. The header pattern (BB) is stored in the header register 20M and assigned to the next frame to be transmitted to the base station 2 and is transmitted to the base station via terminals 62 and 64. At the base station 2, the header pattern (BB) is detected by the reception number detector 42B and the result of the detection is provided to the transmission controller 11B. Accordingly, the transmission controller 11B recognizes that the mobile station 1 has received the user information signal having the transmission number (BB).

Figure 4:
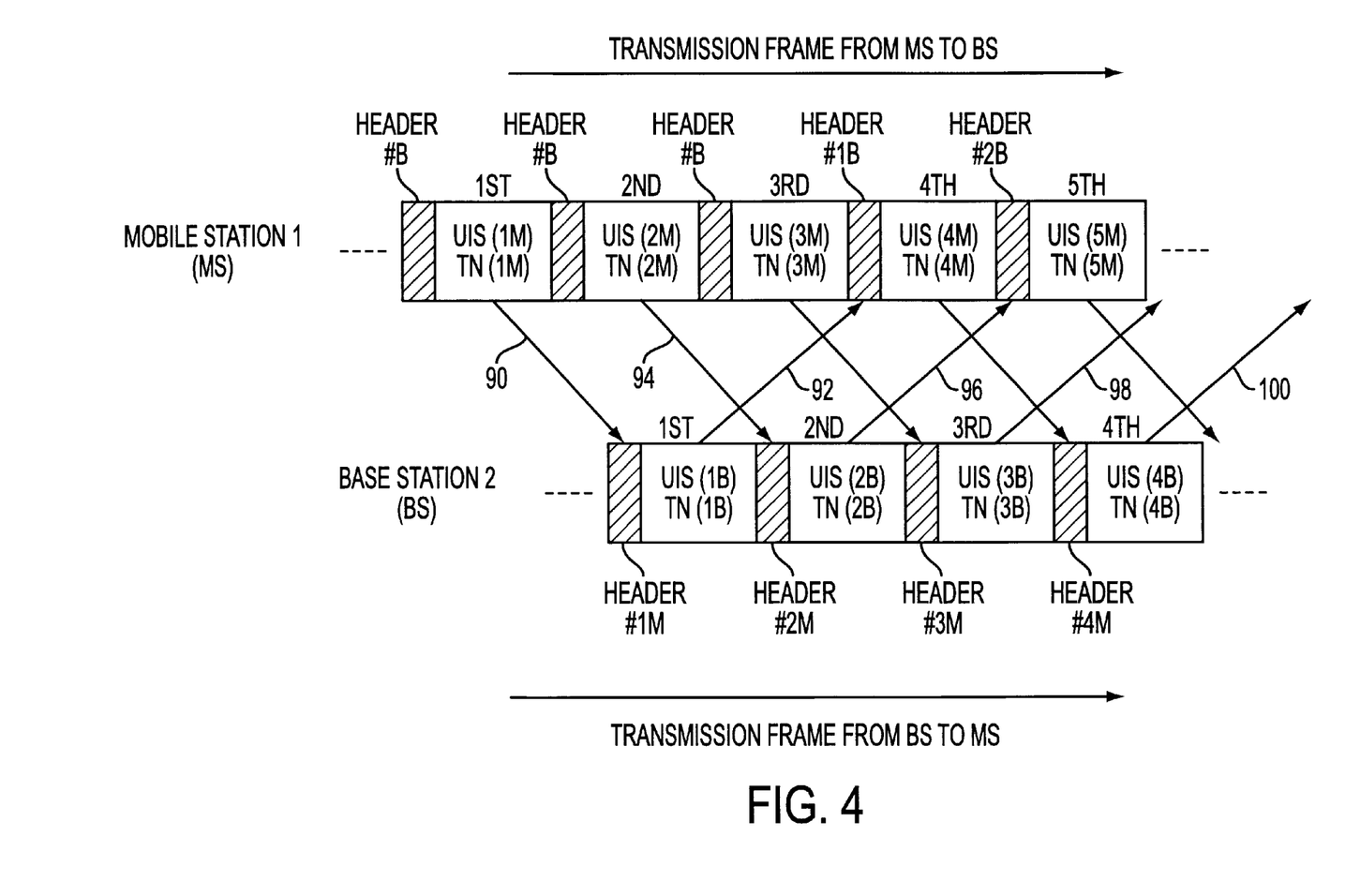
FIG. 4 is a diagram showing the relationship between the transmission number and the header pattern according to the invention.

FIG. 4 is a diagram showing the relationship between the transmission number and the header pattern for an embodiment of the invention. The mobile station 1 transmits a first frame having a header #B, a user information signal UIS (1M), and a transmission number TN (1M) as shown by arrow 90. Where the header #B is only used for synchronizing with a receiver because the mobile station 1 has not yet received any frames, the base station 2 receives the first frame and extracts the transmission number 1M from the first frame. The base station 2 also selects a header (#1M) corresponding to the transmission number (1M) and transmits a first frame having the header #1M, user information signal UIS (1B) and transmission number TN (1B) to the mobile station 1 as shown by arrow 92. The mobile station 1 receives the first frame transmitted by the base station 2 and extracts the header #1M corresponding to the transmission number 1M from the first frame. Accordingly, the mobile station 1 can determine whether or not the base station 2 has received the user information signal 1M.

Next, the mobile station 1 transmits a second frame having a header #B, a user information signal UIS (2M), and a transmission number TN (2M). Where the header #B is only used for synchronizing with a receiver because the mobile station 1 has not yet received any frames, the base station 2 receives, as shown by arrow 94, the second frame and extracts the transmission number 2M therefrom. The base station 2 also selects a header (#2M) corresponding to the transmission number (2M) and transmits a second frame having the header #2M, user information signal UIS (2B), and a transmission number TN (2B) to the mobile station 1 as shown by arrow 96. The mobile station 1 receives the second frame transmitted by the base station 2 and extracts the header #2M corresponding to the transmission number 2M from the second frame. Accordingly, the mobile station 1 can determine whether or not the base station 2 received the user information signal 2M.

Similarly, the mobile station 1 transmits third, fourth and fifth frames each having a user information signal 3M, 4M, 5M . . . and transmission number 3M, 4M, 5M . . . to the base station 2. Then the mobile station 1 receives header patterns corresponding to transmission numbers 3M (arrow 98), 4M (arrow 100), 5M . . . , and with this information the mobile station can determine whether the base station 2 has received user information 3M–5M.

However, when the mobile station 1 transmits the fourth and fifth frames, the mobile station does not use the header #B because the mobile station 1 receives first and second frames transmitted by the base station 2. In this case, the mobile station 1 selects the headers #1B and #2B in response to receiving transmission numbers 1B and 2B included in the first and second frames transmitted by the base station 2.

Consequently, the base station 2 also determines whether or not the mobile station 1 has received the user information signals 1B and 2B in the same way as mobile station 1.

In addition, if the mobile station 1 (or the base station 2) can not receive or distinguish the transmission number included in a user information signal, the mobile station 1 (or base station 2) can retransmit the same user information signal repeatedly based on reception of the transmission number.

While the present invention has been described with reference to the particular illustrative embodiment, it is not to be restricted by the embodiment. It is to be appreciated that those skilled in the art can change or modify the embodiment without departing from the scope thereof. For example, in the above-mentioned embodiment, all bits of the header pattern are changed in response to receiving the transmission number. However, it is possible to change a part of the header pattern in response to receiving the transmission number. Furthermore, the present invention has been described in connection with a CDMA communication system; however, it is possible to change the synchronizing pattern in response to receiving the transmission number in a Time Division Multiple Access (TDMA) communication system. In addition, the present invention can be adapted for use with a control or other channels having a particular bit or header pattern.

What is claimed is:

1. A radio communication system for communicating by means of frames, each frame including a header and data, comprising:
   a mobile station including:
      a transmission number provider for providing a first transmission number to a first frame to be transmitted;
      a transmission number extractor for extracting said first transmission number indicated in a header pattern of a second frame transmitted by a base station;
      a reception number detector for detecting a second transmission number included in said second frame transmitted by said base station; and
      a header provider for providing said header pattern corresponding to said second transmission number to a third frame; and
   a base station including:
      a reception number detector for detecting said first transmission number included in said first frame transmitted by said mobile station;
      a header provider for providing said header pattern corresponding to said first transmission number to said second frame;
      a transmission number provider for providing said second transmission number to said second frame; and
      a transmission number extractor for extracting said second transmission number indicated in a header pattern of said third frame transmitted by said mobile station.

2. The radio communication system according to claim 1, wherein said mobile station further comprises a transmission controller for re-transmitting said first frame when a header pattern corresponding to said first transmission number is not received.

3. The communication system according to claim 1, wherein said base station further comprises a transmission controller for re-transmitting said second frame when a header pattern corresponding to said second transmission number is not received.

4. The radio communication system according to claim 3, wherein said transmission controller has a control table showing transmission of said first transmission number and reception of said header pattern corresponding to said first transmission number for retransmission of said first frame.

* * * * *